United States Patent Office 2,922,365
Patented Jan. 26, 1960

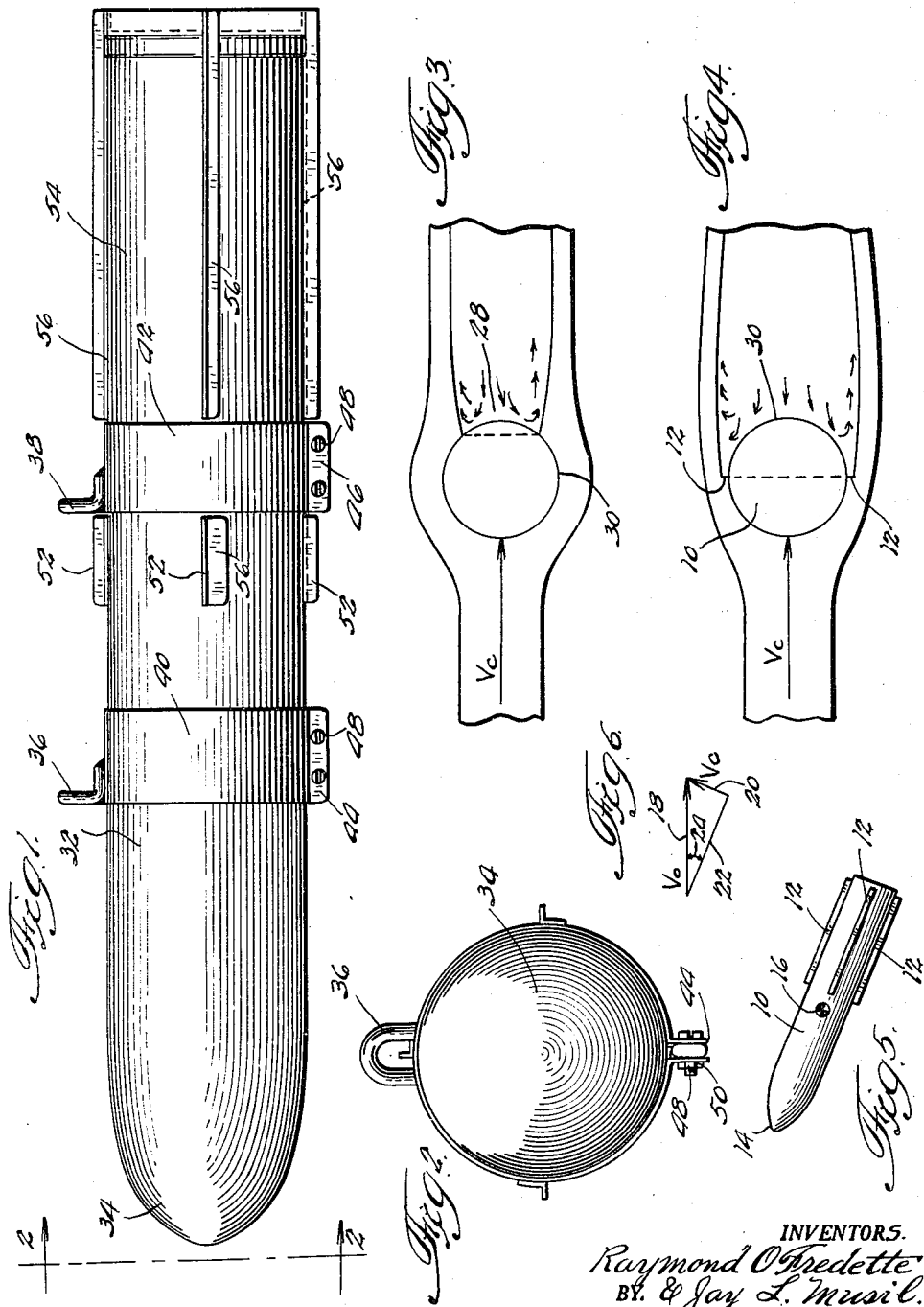

2,922,365
AERIAL MISSILE

Raymond O. Fredette, Skokie, and Jay L. Musil, Cary, Ill., assignors, by mesne assignments, to Cook Electric Company, Chicago, Ill., a corporation of Delaware Application November 28, 1955, Serial No. 549,302

5 Claims. (Cl. 102—50)

This invention relates to a finless aerial missile and more particularly to an improved stabilizing means for finless missiles.

Heretofore missiles designed for discharge from flying aircraft have generally been in either one of two forms. Missiles have been manufactured having large tail fins whereby the aerodynamic forces on the fins determine the flight characteristics and stabilize the missile. Other missiles have been substantially smooth without any external means for stabilizing or directing flight. In slow moving aircraft both of these missile types are satisfactory as the external forces acting upon such missiles as a result of motion through the air are not sufficient to alter the general arcuate trajectory of the missile which is the result of the combined effects of the forward motion of the aircraft and gravity. However, in high speed aircraft where aerodynamic forces become extremely important and space for ordnance stores is limited, both of these missile types are unsatisfactory. A streamlined missile without relatively large fins exhibits unstable aerodynamic characteristics at low speeds, and at high speeds is subjected to large and unpredictable forces due to variable air flows in the vicinity of the missile-deploying aircraft. Such a streamlined missile may actually rise due to these aerodynamic forces and cause severe damage to the fuselage and tail section of the missile-deploying aircraft. Missiles having stabilizing fins have the further disadvantage of requiring excessive care in handling and storage space. In accordance with this invention, the aforementioned objectionable features of missiles known heretofore may be eliminated by applying the principles implicit in the preferred embodiment described hereinafter to achieve release and flight stability with spoilers in lieu of fins. The term spoiler as understood by persons skilled in the art of aerodynamics means any device carried by a body for increasing the separation of airflow around the body while in itself, producing aerodynamic force effects on the body of negligible magnitude in comparison to the force effects resulting from the increased airflow separation.

It is therefore one object of this invention to provide an improved finless aerial missile.

It is a further object of this invention to provide an improved aerial missile especially adapted for high speed flight.

It is a still further object of this invention to provide a finless aerial missile having effective high speed stabilizing means.

It is another object of this invention to provide a finless high speed aerial missile having means for selectively inducing viscous crossflow separation.

A further object of this invention is to provide a finless aerial missile having rearwardly disposed narrow longitudinal spoilers.

It is another object of this invention to provide a finless aerial missile having rearwardly disposed narrow longitudinal spoilers whereby missile deployment from a fast moving aircraft is safe and positive.

Further and additional objects of this invention will become obvious from a consideration of this specification, the accompanying drawings and the appended claims.

In one form of this invention an improved missile is provided having a generally streamlined contour with a plurality of narrow longitudinal spoilers disposed over a portion thereof.

More particularly in one form of this invention, narrow longitudinal spoilers are provided in the rearward portion of a streamlined missile to induce viscous crossflow separation over the rearward portion of the body, thus producing greatly improved stability of the missile.

For a more complete understanding of this invention reference will now be made to the accompanying drawings wherein:

Figure 1 is a side elevational view of one embodiment of this invention;

Fig. 2 is a front view of the embodiment of Fig. 1;

Fig. 3 is a diagrammatic cross-sectional view of the embodiment of Fig. 1 illustrating the crossflow separation at the forward end thereof;

Fig. 4 is a diagrammatic cross-sectional view of the embodiment of Fig. 1 illustrating the induced crossflow separation due to the presence of the spoilers at the rearward portion thereof;

Fig. 5 is a diagrammatic illustration of the embodiment of Fig. 1 in flight; and Fig. 6 is a typical vector diagram of the velocity components about an aerial missile in flight as illustrated in Fig. 5.

Referring now to the drawing, and more particularly to Figs. 5 and 6, a missile 10 is diagrammatically shown in Fig. 5 having a plurality of narrow longitudinal spoilers 12 disposed in equally spaced relationship about the rearward portion thereof. The missile 10 has a rounded or pointed forward end 14 as illustrated in Fig. 5, although it will be clear that any missile configuration may be utilized with the invention described herein. The center of gravity of the missile 10 is illustrated by indicia 16 indicating that the narrow longitudinal spoilers 12 are preferably disposed substantially rearwardly thereof. While the number of spoilers may be varied over a wide range in practicing this invention, the herein-described embodiment employs four such elements spaced equally around the periphery of the missile. The missile 10 may be suspended under the wing or fuselage of an aircraft or within the fuselage in a conventional bomb enclosure.

At low speeds release of conventional finned missiles will permit a normal, generally vertical descent under the influence of gravity. However, at high speeds the effect of gravity may be temporarily overcome by the enormous aerodynamic forces surrounding the aircraft, whereby the missile may rise or tumble into a collision with the aircraft fuselage, wing, or tail assembly.

To eliminate this hazard, means is provided by this invention to stabilize the travel of a missile and to insure more rapid and controlled dispatch of the missile from the aircraft area. If a conventional missile released from the aircraft begins to fall in a nose low attitude, no problem will exist, as in this attitude the nonviscous potential airflow will augment the gravitational effect and produce more rapid deployment of the missile from the aircraft. However, if the missile falls in a nose high attitude as illustrated in Fig. 5 the forces thereon may cause the damage described above. The vector components of velocity, or force, which exists under these conditions are diagrammed in Fig. 6. Vector 18 is the free stream velocity of the air relative to the aircraft, and vector 20 is the crossflow velocity of the air relative to the missile axis. The angle 24 defined by the vector 18 and the missile axis 22 is the angle of attack of the falling missile. The lift and moment acting upon the missile 10 due to the non-viscous potential flow against the missile is supplemented by a lift and moment resulting from the crossflow vector 20 which becomes appreciable for angles of attack greater than about 7°. The lift and moment acting upon a missile as a result of crossflow is proportional to the planiform area of the body and for that portion of the missile which is forward of the center of gravity 16, the crossflow forces acting thereon tend to produce further instability and tumbling of the missile, while the forces acting upon the missile portion rearwardly of the center of gravity 16 produce stabilizing forces counteracting the forces due to nonviscous potential flow and the crossforce acting upon the forward portion of the missile, thus tending to align the missile axis with the free stream velocity vector.

In a real viscous fluid the point of flow separation on a transverse circular segment of a missile traveling therein is determined by the magnitude of the positive pressure gradient at the rear of the segment and the type of boundary layer over the forward portion. If the boundary layer is laminar, as is true at very low velocities and for missiles of very small diameters, separation will occur at or near the lines represented by points 12 of Figure 4 between windward and leeward surfaces of the segment. Crossflow separation occurring under these conditions will produce a drag coefficient, depending upon the diameter of the segment, of about 1.2. When the boundary layer over the forward part of the segment is turbulent there is an exchange of mass and momentum between the outer streamlines and those adjacent to the body. The streamlines at the surface of the body have more energy to flow against the rear side 28 (Fig. 3) of the segment. Thus, the turbulent boundary layer flow attaches itself farther to the rear of the body as illustrated in Fig. 3, and the crossflow drag coefficient is reduced to a value of about 0.3. Experience has shown that for speeds above 150 miles per hour most practical size missiles typical of the configuration shown in Fig. 1 are in a regime of turbulent airflow. Thus, at angles of attack the crossflow over a given circular segment of the missile where there are no spoilers may be as illustrated by Fig. 3.

The addition of the narrow longitudinal spoilers 12 to the rear portion of the missile 10 (Figs. 4 and 5) acts to destroy the energy of the turbulent boundary layer flow at the equator of the circular section of the missile body where the spoilers are located. This induces pronounced equatorial crossflow separation as illustrated in Fig. 4. Thus, the spoilers have the effect of increasing the crossflow drag coefficient by a factor of 4 or 5 by causing flow separation to occur at points on or closer to the equator of the circular segment and as a result, greatly improving the aerodynamic stability of the missile without the use of lift producing fins. Such a missile will never have more than a minimum angle of attack at release. This fact insures positive and safe deployment from the aircraft. In accordance with this invention, therefore, the use of narrow longitudinal spoilers having radial dimensions of the order of 1–5% of the missile diameter will produce crossflow separation of the order of four to five times the normal crossflow drag of the same missile without spoilers.

One particular embodiment of this invention is illustrated in Figs. 1 and 2. Therein a missile 32 having a generally cylindrical cross section and a rounded nose portion 34 is provided with two conventional hangers 36 and 38. The hangers may be secured to the missile 32 in any conventional manner and are herein illustrated as attached to the missile by straps 40 and 42. The straps have abutting flanges 44 and 46 which are secured together by bolts 48 and associated nuts 50. Four narrow longitudinal spoilers 52 are secured to the rearward cylindrical portion 54 of missile 32.

The spoilers 52 in one particular construction have a radial dimension of approximately .25 inch, while the over-all diameter of the missile is approximately 5 inches.

The spoilers 52 may be secured to the missile 32 in any desired manner. In the embodiment herein described a transverse flange 56 is formed on each of the spoilers 52 and the flange 56 is welded to the missile body.

It has been found that the concepts of this invention are especially applicable in circumstances where the Reynold's number exceeds a value of $6 \times 10^5$ based on the missile's length and where the product of the sine of the angle of attack and the Mach number is less than .4. It is preferred that the radial dimension of the spoilers does not exceed approximately .05 times the diameter of the missile and it has been generally found that to be effective the spoilers should have a dimension at least .01 times the diameter of the missile. By maintaining the spoilers within this range the entire missile and stabilizing means with spoilers spaced at 90° about the periphery of the missile will fit within an area having a square cross section, one side of which is the diameter of the missile. The advantages of this configuration in packing and handling contribute greatly to the safety and facility with which such missiles may be handled.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. An aerial missile characterized by aerodynamic stability without the use of fins, the said missile comprising an elongated body, and a plurality of means carried by, and capable of exerting minute force effects on said body for increasing the effective crossflow separation of at least an airstream component flowing in a direction normal to the longitudinal axis of said body, said means being disposed along the peripheral surface eccentrically with respect to the center of gravity of said body and in parallel relationship to the said axis, whereby the drag coefficient of the body portion carrying said means is increased sufficiently relative to the remaining body portion to cause said body to become and remain aerodynamically stable in an attitude where an airstream first will pass the said remaining portion and then the said carrying portion of said body.

2. An aerial missile characterized by aerodynamic stability without the use of fins, the said missile comprising an elongated body having forward and rear longitudinal portions on each side of a center of gravity, and a plurality of means carried by, and capable of exerting negligible force effects on said body for increasing the effective crossflow separation of at least an airstream component flowing in a direction normal to the longitudinal axis of said body, said means being disposed along the peripheral surface of said rearward portion and in parallel relationship to the said axis, whereby the drag coefficient of the said rearward portion is increased sufficiently relative to the said forward portion to cause said body to become and remain aerodynamically stable in an attitude where an airstream will pass the said forward position before the said rearward portion.

3. An aerial missile characterized by aerodynamic stability without the use of fins, the said missile comprising: an elongated body having a center of gravity between forward and rearward longitudinal portions and a plurality of spoilers disposed on the peripheral surface of said rearward portion and in parallel relationship to the longitudinal axis of said body for increasing the effective crossflow separation of at least an airstream component flowing in a direction normal to said axis, whereby the drag coefficient of the said rearward portion is increased sufficiently relative to the forward portion to cause said body to become and remain aerodynamically stable in an attitude where an airstream will pass the said forward portion before the said rearward portion.

4. An aerodynamically stable missile without fins comprising an elongated body having a center of gravity between forward and rearward longitudinal portions, and a multiplicity of spoilers disposed on the peripheral surface of said rearward portion and in parallel relationship to the longitudinal axis of said body for increasing the effective crossflow separation of at least an airstream component flowing in a direction normal to said axis, each of said spoilers having a radial dimension within the range of one-to-two percent of the cross-sectional diameter of said body from each spoiler through the said axis, whereby the drag coefficient of the said rearward portion is increased sufficiently relative to the said forward portion to cause said body to become and remain aerodynamically stable in an attitude where an airstream first will pass the said forward portion and then the said rearward portion.

5. An aerodynamically stable missile without fins comprising an elongated body having a center of gravity between forward and rearward longitudinal portions, and a multiplicity of spoilers disposed on the peripheral surface of said rearward portion and in parallel relationship to the longitudinal axis of said body for increasing the effective crossflow separation of at least an airstream component flowing in a direction normal to said axis, each of said spoilers having a radial dimension within the range of one-to-five percent of the cross-sectional diameter of said body from each said spoiler through the said axis, whereby the drag coefficient of the said rearward portion is increased sufficiently relative to the said forward portion to cause said body to become and remain aerodynamically stable in an attitude where an an airstream first will pass the said forward portion and then the said rearward portion.

References Cited in the file of this patent

UNITED STATES PATENTS

| 1,277,942 | Kaylor | Sept. 3, 1918 |
| 1,520,131 | Jacob | Dec. 23, 1924 |
| 2,360,696 | Long | Oct. 17, 1944 |
| 2,437,211 | Schermuly | Mar. 2, 1948 |
| 2,470,489 | Hopkins | May 17, 1949 |
| 2,480,927 | Hopkins | Sept. 6, 1949 |
| 2,494,026 | Anderson | Jan. 10, 1950 |

FOREIGN PATENTS

| 244,484 | Italy | Feb. 22, 1926 |